Patented Oct. 31, 1950

2,528,274

UNITED STATES PATENT OFFICE 2,528,274

AMIDE COMPOSITION

Lewis O. Gunderson, Park Ridge, Ill., assignor to Dearborn Chemical Company, Chicago, Ill., a corporation of Illinois No Drawing. Original application September 9, 1947, Serial No. 773,078. Divided and this application November 24, 1947, Serial No. 787,845

4 Claims. (Cl. 260—404.5)

This invention relates to novel amide compositions suitable, inter alia, for use in eliminating foaming conditions in steam boilers.

The novel compositions of the present invention include trilauroyl diethylene triamine, tetralauroyl triethylene tetramine, tetralauroyl tetraethylene pentamine and pentacapryl tetraethylene pentamine. These compounds may be used, for instance, to inhibit foaming of boiler water.

It is therefore an important object of the present invention to provide novel amide compositions adapted for use in the prevention of foaming in boiler water and for other purposes.

Other and further features and objects of the present invention will become apparent from the following detailed disclosure and appended claims.

Trilauroyl diethylene triamine, having the formula:

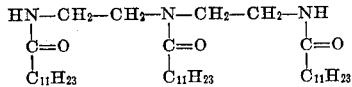

may be prepared as follows. 75 grams of lauric acid were heated with 12 grams diethylene triamine for 6 hours at 180° to 200° C. Titration of the reaction mass with $\frac{1}{10}$ normal alcoholic solution of sodium hydroxide, using Poirrier's Blue as indicator, showed that the reaction mass contained 1.4% of unreacted acid. The product is soluble in benzene and ethyl acetate and contains 6.65% nitrogen, as compared with the theoretical nitrogen content of 6.46%.

Tetralauroyl triethylene tetramine, having the formula:

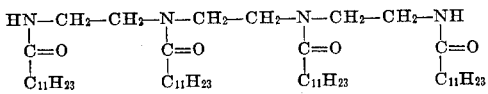

may be prepared as follows. 75 grams of lauric acid were heated with 17 grams triethylene tetramine at 180° to 220° C. for 6 hours. Titration of the reaction mass with $\frac{1}{10}$ normal alcoholic sodium hydroxide solution, using Poirrier's Blue as indicator, showed that reaction mass contained 4.8% unreacted acids. The product is soluble in benzene and ethyl acetate and contains 7.22% nitrogen, as compared with the theoretical nitrogen content of 6.73%.

Tetralauroyl tetraethylene pentamine, having the formula:

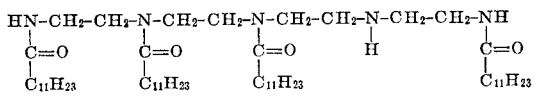

may be prepared as follows. 75 grams lauric acid were heated with 22 grams tetraethylene pentamine at 180° to 200° C. for 6 hours. Titration of the reaction mass with $\frac{1}{10}$ normal alcoholic sodium hydroxide solution, using Poirrier's Blue as indicator, showed that reaction mass contained 3.27% unreacted acid. The product is soluble in ethyl acetate, and contains 7.60% nitrogen, as compared with the theoretical nitrogen content of 7.60%.

Tetralauroyl tetraethylene pentamine may also be prepared as follows. 80 grams of lauric acid were heated with 19 grams of tetraethylene pentamine at from 175° to 185° C. for 21 hours, yielding a product having an acid number of 28.1. The reaction mass obtained had a nitrogen content of 7.12%. Correction for the acid content indicates a nitrogen content of 7.90%.

Pentacapryl tetraethylene pentamine, having the formula:

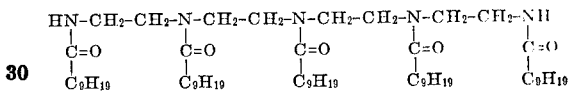

may be prepared as follows. 345 grams capric acid, 54 grams tetraethylene pentamine and 20 grams of dry silica gel were heated together for 30 hours at from 160° to 210° C. Titration of the reaction mass with $\frac{1}{10}$ normal alcoholic sodium hydroxide solution, using Poirrier's Blue as indicator, showed that 34.4% of the acid had not reacted. The unreacted capric acid was removed by vacuum distillation, 124.2 grams being recovered. The residue from the distillation was recrystallized from 300 cc. hot acetone. The insoluble material which was filtered off weighed 72.9 grams and formed a light brown powder melting at 107 to 110° and having a nitrogen content of 7.29%, compared with a theoretical nitrogen content of 7.3%.

Pentacapryl tetraethylene pentamine may also be prepared as follows. 5 lbs. of capric acid and 1.1 lb. of tetraethylene pentamine were placed in a 4-liter beaker and heated with constant stirring over a free flame at 190° to 299° C. for 35 hours. At this time, the free acidity had dropped to 5.56%. The product obtained had a nitrogen content of 8.30% and, corrected for the unreacted acid, a nitrogen content of 7.29%.

The foam inhibiting compositions of the present invention may be introduced into steam boiler water in the form of colloidal dispersions that may be stabilized with tannin, gum arabic, pectin, or the like. If desired, the foam inhibiting compositions may be introduced into the boiler in the form of a solution in an appropriate solvent, such as isopropyl alcohol or the like. The dosages required are generally quite small, on the order of some few parts per million of boiler water. In general, from 0.1 to about 50 parts per million of foam inhibiting compounds may be added to boiler water, preferably in combination with tannin. Addition of foam inhibiting compounds may be repeated as required to prevent foaming.

This application is a division of my application, Serial No. 773,078, filed September 9, 1947.

Many details in composition and procedure may be varied through a wide range without departing from the principles of this invention, and it is, therefore not my purpose to limit the patent granted on this invention otherwise than necessitated by the scope of the appended claims.

I claim as my invention:

1. As a new composition of matter, a material selected from the group consisting of trilauroyl diethylene triamine, tetralauroyl triethylene tetramine, tetralauroyl tetraethylene pentamine, and pentacapryl tetraethylene pentamine.

2. As a new composition of matter, pentacapryl tetraethylene pentamine.

3. As a new composition of matter, tetralauroyl tetraethylene pentamine.

4. As a new composition of matter, tetralauroyl triethylene tetramine.

LEWIS O. GUNDERSON.

REFERENCES CITED

The following references are of record in the file of this patent:

UNITED STATES PATENTS

| Number | Name | Date |
|---|---|---|
| 1,534,525 | Hartmann et al. | Apr. 21, 1925 |
| 2,243,329 | DeGroote et al. | May 27, 1941 |
| 2,322,201 | Jayn et al. | June 15, 1943 |
| 2,345,632 | Robinson et al. | Apr. 4, 1944 |
| 2,371,736 | Carson | Mar. 20, 1945 |
| 2,419,404 | Johnson | Apr. 22, 1947 |